Nov. 9, 1954  C. J. RAPP  2,694,028
ALUMINUM BASED LAMINATE MEMBER AND PROCESS FOR PRODUCING THE SAME
Filed May 28, 1952
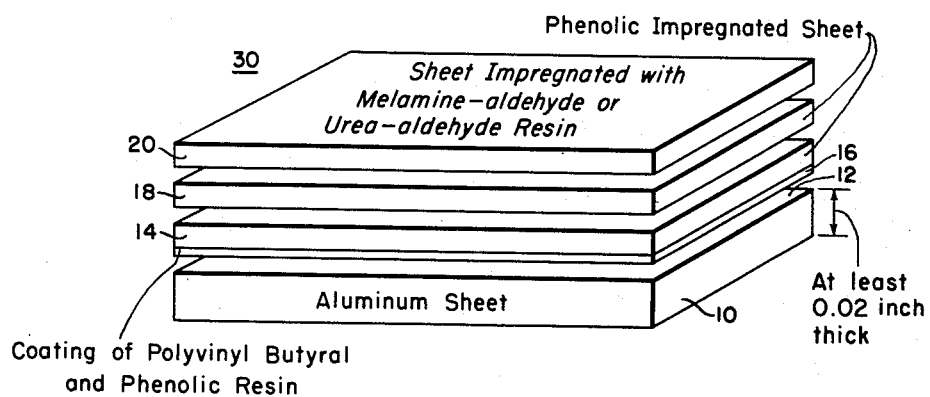
INVENTOR
Christian J. Rapp.
ATTORNEY

United States Patent Office 2,694,028
Patented Nov. 9, 1954

2,694,028

ALUMINUM BASED LAMINATE MEMBER AND PROCESS FOR PRODUCING THE SAME

Christian J. Rapp, Hampton, S. C., assignor to Westinghouse Electric Corporation, East Pittsburgh, Pa., a corporation of Pennsylvania Application May 28, 1952, Serial No. 290,411

5 Claims. (Cl. 154—129)

This invention relates to laminated members embodying sheet aluminum of substantial thickness as a base.

It has long been held desirable to affix to aluminum base members of substantial thickness a resinous laminate facing having a predetermined surface color and finish. However, previously known techniques for laminating or bonding resinous treated fibrous sheets to aluminum of substantial thickness have not been satisfactory. Conventional resins employed to bond the fibrous sheets to the aluminum base member delaminate readily when exposed to variations in humidity and temperature. In some cases, only a portion of the fibrous sheets lifts or blisters, while in other cases the applied sheets crack or craze. Inasmuch as the widest ranges of colors and decorative finishes are obtainable with melamine-formaldehyde and urea-formaldehyde resins, it is desirable to employ these resins as the exterior surface of such aluminum fibrous sheet laminate members. However, the molding procedures required in adequately bonding the fibrous sheets to the aluminum base member ordinarily caused deterioration of the melamine-formaldehyde or urea-formaldehyde resin with consequent discoloration.

The object of the present invention is to provide a process for durably bonding to an aluminum sheet of substantial thickness a face laminate comprising fibrous sheets having the exterior surface impregnated with a melamine-formaldehyde or urea-formaldehyde resin.

A further object of the invention is to provide a durable bond between sheet aluminum of a substantial thickness with a resinous laminate applied to at least one face thereof.

Other objects of the invention will in part be obvious and will in part appear hereinafter. For a better understanding of the nature and objects of the invention, reference should be had to the following detailed description of the drawing in which the single figure is a schematic view of an assembly of sheets in accordance with the present invention.

In accordance with the present invention, composite laminate members are prepared on a base comprising sheet aluminum of a thickness of at least 0.02 inch, the aluminum sheet having on at least one face thereof a laminate comprising sheet fibrous material adherently bondable thereto that will mold without deterioration of the surface finish and, after being molded, will stand variations in temperature and humidity. Briefly, in preparing the composite laminate member of this invention, a body sheet of aluminum of a thickness of at least 0.02 inch (the thickness of the aluminum may be much greater, for example, one-quarter inch) has applied to one or both faces a coextensive binder sheet of fibrous material. This coextensive sheet of fibrous material carries at its face in contact with the aluminum sheet, a specific thermosettable resinous binder highly adherent to aluminum. Superimposed on this binder sheet is a face laminate comprising at least two sheets of fibrous material coextensive therewith, the face laminate comprising at least one outer sheet of fibrous material with a resin selected from at least one of the group consisting of thermoset melamine-aldehyde and urea aldehyde-resins, and the inner sheet or sheets which are in contact with the binder sheet are impregnated with a thermosetting phenolic resin.

It has been discovered to be critical to employ as the thermoset resin on the binder sheet, a mixture of from 25 to 80 parts by weight of polyvinyl butyral and from 75 to 20 parts by weight of a phenolic resin derived as follows: reacting at about the boiling point of the mixture 1.0 mol of a phenol and from 0.8 to 1.2 mols of formaldehyde with from about ⅙% to 1% of the weight of the phenol of an alkali hydroxide catalyst to effect an initial reaction, evacuating to remove unreacted formaldehyde and water, the initial reaction being conducted for a period of time inversely proportional to the amount of catalyst and corresponding to about one-half hour for ⅓%, introducing an ammonium salt and ammonium hydroxide into the partially reacted mixture, the ammonium salt chemically reacting with the alkali hydroxide to produce an alkali salt, which will precipitate, and ammonium hydroxide, the total ammonium hydroxide effecting a secondary catalytic reaction to produce a properly resinified material, evacuation with heat being applied after the second catalyst has been present for about an hour, dissolving the resinified material in a solvent and centrifuging the resin solution to remove the alkali salt precipitate and to effect clarification.

In the production of the type of phenol base resin hereinbefore referred to, the base materials are phenols and formaldehyde, or polymers of formaldehyde. A particularly satisfactory phenol for this purpose is the mixture of cresols and xylenols, commercially known as cresylic acid. Ordinary phenol and meta-para cresol have been used with success. However, other phenols may be used for preparing this varnish.

A 37% to 40% aqueous formaldehyde solution is employed for reaction with the cresylic acid, since it is a standard material available on the market. Formaldehyde base materials, such as paraformaldehyde or other polymers of formaldehyde and related substances, may be substituted for the aqueous formaldehyde solution above indicated. The specific process hereinafter detailed will be described in reference to 40% formaldehyde solution, but substitution of these various other formaldehyde base materials will be obvious to those skilled in the art.

Suitable catalysts for effecting initial reaction of the cresylic acid and formaldehyde are the metallic hydroxides selected from the group of alkali metal hydroxides and alkaline earth metal hydroxides. Examples of suitable catalysts from this group are potassium hydroxide, sodium hydroxide, calcium hydroxide and barium hydroxide.

In some instances it has been found satisfactory to vary the amount of the catalyst from ⅙ to 1 part for 100 parts of the phenol, the time of refluxing and stirring of the catalysts with the reactants inversely corresponding to one-half hour for one-third of 1% of catalyst. Thus, one hour of refluxing is required for ⅙ part of catalyst per 100 parts of the phenol.

The secondary catalyst, which it is necessary to use in this application, consists in part of an ammonium salt, which, when introduced into the initial reaction mixture, will form a metallic salt precipitate with the alkali or alkaline earth metal hydroxide, and ammonium hydroxide from the hydroxyl radical of the catalyst present. Ammonium sulfate has been particularly successful in achieving this chemical reaction. Ammonium sulfate in quantities sufficient to react with substantially all the sodium hydroxide, for example, to form sodium sulfate and ammonium hydroxide, is introduced in water solution. The sodium sulfate precipitates in the phenol-formaldehyde resinous product when the water has been removed by evacuation.

Additional ammonium hydroxide is also added in order to cause the second stage of resinification to proceed; usually from 2 to 4 parts of 30% aqua ammonia solution is added per 100 parts of phenol.

The second stage of polymerization is allowed to proceed for a time period of from one and one-half to two and one-half hours, with evacuation to an absolute pressure of less than 5 inches of mercury and external heating during the latter half of this period, at the end of which period the material within the reaction vessel is a thick viscous resin and substantially all of the moisture has been removed. It is believed that any unreacted excess of formaldehyde has either been removed or is combined with the ammonia to form hexamethylenetetramine. Dispersed within this resinous mass is a small amount of sodium sulfate precipitate. The product is substantially an A-stage phenol-formaldehyde resin.

In order to provide for applying the resin to fabrics or paper, 70 to 100 parts of a solvent consisting of from 35 to 100 parts of ethyl alcohol and up to 50 parts of benzenoid solvents, such as benzol, toluene and xylene, and other phenol-formaldehyde solvents are added to the resin. A satisfactory mixture consists of 50% ethyl alcohol and 50% benzol. Ethyl alcohol alone is also a satisfactory solvent.

Examples of suitable proportions of reactants are the following:

| | Parts |
|---|---|
| 1. Cresylic acid | 1250 |
| 40% formaldehyde | 840 |
| 2. Meta-para cresol | 1200 |
| 40% formaldehyde | 750 |
| 3. Phenol | 1000 |
| 40% formaldehyde | 600 |

The binder sheet may comprise kraft paper or alpha-cellulose paper or other cellulosic material or even a cloth such as muslin or cotton duck. The mixture of polyvinyl butyral and the phenolic resin is applied to one face of the fibrous sheet in suitable coating equipment to apply thereto resin solids equal to at least 50% of the weight of the sheet fibrous material. The coating will partly penetrate into the sheet fibrous material. The quantity of applied resin may be as much as 150% of the weight of the sheet fibrous material.

The inner portion of the face laminate may comprise one or more sheets of kraft paper or alpha-cellulose paper or cloth impregnated with at least 50% of its weight of a phenolic resin, such as that disclosed in detail hereinabove. Other phenolic resins may be admixed with this phenolic resin, the only requirement being that the phenolic resins be impregnating-type resins that will thermoset under heat and pressure. The exposed surface of the face laminate must comprise at least one sheet of fibrous material, for example, kraft paper impregnated with at least 50% of its weight with a melamine-formaldehyde or urea-formaldehyde resin or a mixture thereof. It will be appreciated that in many cases, the melamine-formaldehyde and urea-formaldehyde resin have been made in the presence of butanol and that they comprise butylated polymers. The terms "melamine-aldehyde" and "urea-aldehyde," respectively, are intended to apply to such compositions which comprise essentially these reactants as the main ingredients. The manufacture of the melamine-aldehyde and urea-aldehyde resins suitable for the practice of the present invention is well known in the art and need not be detailed herein.

Referring to the single figure of the drawing, there is shown a sheet 10 of aluminum of a thickness of at least 0.02 inch. There is then applied coextensively over at least the face 12 of the sheet of aluminum a coextensive binder sheet 14 having applied to the side of the sheet 14 to be put in contact with the face 12 a coating 16 comprising 25 to 80 parts of polyvinyl butyral and 75 to 20 parts by weight of the specific phenolic resin described above. Over the sheet 14 is applied a face laminate comprising at least two sheets 18 and 20, the sheet 18 being impregnated with a phenolic resin preferably, but not necessarily, the same phenolic resin as employed in the coating 16, while the sheet 20 is impregnated with a melamine aldehyde or urea aldehyde resin or mixtures thereof.

It will be appreciated that the face 12 of the sheet of aluminum has been cleaned to remove therefrom any grease, dirt, or the like that would interfere with the attaining of a good bond with sheet 14.

Thereafter, the resulting stack 30 as shown in the figure of the drawing, is introduced into a molding press where the stack may be subjected to a temperature of from 140° C. to 155° C., while under pressure of from 1000 p. s. i. to 1800 p. s. i. Ordinarily, a molding time of fifteen minutes is adequate to cause the resins to fuse, distribute themselves through the sheet fibrous material, and thereafter to thermoset. However, in some cases, a plurality of stacks 30, each separated by a stainless steel separator plate has been put in a press and it has required a molding time of as much as an hour to attain a fully cured condition in all the separate laminated members. In the fully cured, laminated member, the total thickness of sheets 14, 18, and 20 does not substantially exceed the thickness of the aluminum member 10.

A considerable variety of laminated members in accordance with the present invention has been produced commercially. In one instance, there was bonded to a sheet aluminum 1/16 of an inch in thickness a total thickness of 1/64 inch of laminated kraft paper sheets on each face thereof. The exposed surface in each case comprised a light colored melamine-formaldehyde resin. In another case, a sheet of aluminum of 0.025 inch in thickness had bonded to its surface, a total of five sheets of alpha-cellulose paper to a total thickness of 0.025 inch when cured. The resulting laminate had a thickness of 0.05 inch. These members were subjected to numerous tests to determine their resistance to changes by reason of immersion in water at room temperature. In all cases, the shrinkage was less than 0.1% with the grain of the paper and did not exceed 0.1% crosswise to the grain of the paper. The percentage of water absorbed was considerably less than 1% in all cases. Upon immersion in boiling water for two hours, the increase in thickness of these laminates did not exceed 0.5%. The weight increase was 1.13% in the case of the sheet having the total thickness of 0.05 inch. When subjected to numerous changes in humidity as well as refrigeration and cycling from a warm room into a refrigerator, none of the laminates showed any sign of delamination, crazing or chalking after tests totaling 150 days.

In some instances I have prepared a laminated member by employing as the sheet 20, one comprising a printed patterned sheet or linen cloth treated with melamine resin, and then superimposed a final sheet comprising a transparent overlay treated with melamine so that in the final laminate this printed patterned sheet or cloth is visible through the overlay.

The term "aluminum" as employed herein is intended to apply not only to pure aluminum but to the alloys of aluminum containing substantial amounts of other metals and additions.

Since certain obvious changes may be made in the above procedure and different embodiments of the invention could be made without departing from the scope thereof, it is intended that all matter contained in the above description shall be interpreted as illustrative and not in a limiting sense.

I claim as my invention:

1. A composite laminated member composed of (a) a body sheet of aluminum of a thickness of at least 0.02 inch, (b) a face laminate comprising at least two sheets of fibrous material coextensive over at least one face of the sheet of aluminum and of a thickness not substantially exceeding the thickness of the sheet of aluminum, the face laminate having an outer sheet of fibrous material impregnated with a resin selected from the group consisting of thermoset melamine-aldehyde and urea-aldehyde resins and an innermost sheet of fibrous material impregnated with a thermoset phenol-aldehyde resin, and (c) a binder sheet coextensive with the sheet of aluminum and disposed between the sheet of aluminum and the face laminate, the binder sheet comprising sheet fibrous material coated on the side in contact with the sheet of aluminum with at least 50% of its weight of a thermoset resin highly adherent to aluminum, the thermoset resin comprising essentially from 25 to 80 parts by weight of polyvinyl butyral and from 75 to 20 parts by weight of a phenolic resin derived by reacting at about the boiling point of the mixture 1.0 mol of a phenol and from 0.8 to 1.2 mols of formaldehyde with from about 1/6% to 1% of the weight of the phenol of an alkali hydroxide catalyst to effect an initial reaction, evacuating to remove unreacted formaldehyde and water, the initial reaction being conducted for a period of time inversely proportional to the amount of catalyst and corresponding to about one-half hour for 1/3%, introducing an ammonium salt and ammonium hydroxide into the partially reacted mixture, the ammonium salt chemically reacting with the alkali hydroxide to produce an alkali salt, which will precipitate, and ammonium hydroxide, the total ammonium hydroxide effecting a secondary catalytic reaction to produce a resinified material, dissolving the resinified material in a solvent and centrifuging the resin solution to remove the alkali salt precipitate and to effect clarification.

2. The laminated member of claim 1 wherein the (b) face laminate is applied to both faces of the sheet of aluminum.

3. The laminated member of claim 1 wherein the combined thickness of the (b) face laminate and the (c) binder sheet does not exceed 0.030 inch.

4. The laminated member of claim 1 wherein both the face laminate and the binder sheet consist of sheets of paper as the fibrous material.

5. The method of producing a decorative aluminum-resin laminated member having at least one outer surface of predetermined color, comprising, applying over a cleaned sheet of aluminum of at least 0.02 inch in thickness a coextensive sheet of cellulosic fibrous material having a coating of resin on the side in contact with the aluminum, the coating of resin equal to at least 50% of the weight of the sheet of cellulosic fibrous material, the resin composed of from 25 to 80 parts by weight of polyvinyl butyral and from 75 to 20 parts by weight of a phenolic resin derived by reacting at about the boiling point of the mixture 1.0 mol of a phenol and from 0.8 to 1.2 mols of formaldehyde with from about $1/8\%$ to 1% of the weight of the phenol of an alkali hydroxide catalyst to effect an initial reaction, evacuating to remove unreacted formaldehyde and water, the initial reaction being conducted for a period of time inversely proportional to the amount of catalyst and corresponding to about one-half hour for $1/3\%$, introducing an ammonium salt and ammonium hydroxide into the partially reacted mixture, the ammonium salt chemically reacting with the alkali hydroxide to produce an alkali salt, which will precipitate, and ammonium hydroxide, the total ammonium hydroxide effecting a secondary catalytic reaction to produce a resinified material, dissolving the resinified material in a solvent and centrifuging the resin solution to remove the alkali salt precipitate and to effect clarification, superimposing over the binder sheet and coextensive therewith at least one sheet of cellulosic fibrous material impregnated with at least 50% of its weight of the same phenol-aldehyde resin as applied to the binder sheet, and superimposing thereover at least one sheet of cellulosic fibrous material impregnated with at least 50% of its weight of a partially reacted, thermosettable resin selected from the group consisting of urea-aldehyde and melamine-aldehyde resins, the outermost sheet of the last-mentioned sheets having a predetermined surface appearance, molding the assembled stack of sheets at a temperature of from 140° C. to 155° C. and a pressure of from 1000 to 1800 pounds per square inch for a period of time of at least 15 minutes and until the resins have thermoset, the combined thickness of the molded sheets of cellulosic fibrous material not exceeding the thickness of the sheet of aluminum.

References Cited in the file of this patent

UNITED STATES PATENTS

| Number | Name | Date |
|---|---|---|
| 1,844,512 | Mains | Feb. 9, 1932 |
| 1,972,307 | Loetscher | Sept. 4, 1934 |
| 2,015,711 | Cherry | Oct. 1, 1935 |
| 2,292,118 | Guhl | Aug. 4, 1942 |
| 2,387,831 | Cogan et al. | Oct. 30, 1945 |
| 2,430,053 | Hershberger | Nov. 4, 1947 |
| 2,439,929 | Hill et al. | Apr. 20, 1948 |
| 2,447,621 | Smidth | Aug. 24, 1948 |
| 2,451,410 | Queeny | Oct. 12, 1948 |
| 2,478,943 | Rhodes | Aug. 16, 1949 |